US011602846B2

(12) United States Patent
Nagayama et al.

(10) Patent No.: US 11,602,846 B2
(45) Date of Patent: Mar. 14, 2023

(54) SEARCH APPARATUS, SEARCH METHOD, AND SEARCH PROGRAM

(71) Applicant: Mercari, Inc., Tokyo (JP)

(72) Inventors: Shota Nagayama, Tokyo (JP); Tomomi Ota, Tokyo (JP)

(73) Assignee: MERCARI INC., Tokyo (JP)

(*) Notice: Subject to any disclaimer, the term of this patent is extended or adjusted under 35 U.S.C. 154(b) by 291 days.

(21) Appl. No.: 16/724,515

(22) Filed: Dec. 23, 2019

(65) Prior Publication Data
US 2020/0198138 A1 Jun. 25, 2020

(30) Foreign Application Priority Data

Dec. 25, 2018 (JP) .............................. JP2018-241666

(51) Int. Cl.
*B25J 9/16* (2006.01)
*G06N 10/00* (2022.01)

(52) U.S. Cl.
CPC ........... *B25J 9/1664* (2013.01); *B25J 9/1653* (2013.01); *G06N 10/00* (2019.01)

(58) Field of Classification Search
CPC combination set(s) only.
See application file for complete search history.

(56) References Cited

U.S. PATENT DOCUMENTS

| 9,256,834 | B2 | 2/2016 | Bonderson et al. |
| 9,342,792 | B2 | 5/2016 | Utsunomiya et al. |
| 9,858,531 | B1 | 1/2018 | Monroe et al. |
| 9,996,801 | B2 | 6/2018 | Shim et al. |
| 10,044,638 | B2 | 8/2018 | Dadashikelayeh et al. |

(Continued)

FOREIGN PATENT DOCUMENTS

JP H02-005129 A 1/1990

OTHER PUBLICATIONS

Christopher Berhnardt, "In the future, everyone might use quantum computers", Mar. 26, 2019. https://theconversation.com/in-the-future-everyone-might-use-quantum-computers-112063 (Year: 2019).*

(Continued)

*Primary Examiner* — Jeff A Burke
*Assistant Examiner* — Arslan Azhar
(74) *Attorney, Agent, or Firm* — Sterne, Kessler, Goldstein & Fox P.L.L.C.

(57) ABSTRACT

A search device, a search method, and a search program for causing a quantum computer to search for angles of joints of a robot such as a robot arm at which the posture of the robot satisfies a predetermined condition by using a quantum algorithm are provided. The search device includes a specifying unit that specifies a function for identifying whether or not a posture of a robot satisfies a predetermined condition, a setting unit that applies a unitary transformation formed based on the function to a plurality of qubits corresponding to an angle of a joint of the robot a number of times according to the number of the plurality of qubits and sets a quantum computer so as to search for a state of the plurality of qubits corresponding to the angle satisfying the predetermined condition according to a quantum algorithm, and a calculation unit that calculates the angle corresponding to a measurement value of the plurality of qubits.

9 Claims, 7 Drawing Sheets

(56) References Cited

U.S. PATENT DOCUMENTS

| | | |
|---|---|---|
| 10,068,182 B2 | 9/2018 | Nakamura et al. |
| 2017/0286858 A1 | 10/2017 | La Cour et al. |
| 2018/0314968 A1 | 11/2018 | Biamonte et al. |

OTHER PUBLICATIONS

Melody Lee, "How close are we to quantum computing", Aug. 2, 2021. https://www.qmunity.tech/post/how-close-are-we-to-quantum-computing (Year: 2021).*

Daphne Leprince-Ringuet, "IBM's first quantum computer outside of the US has just gone live", May 15, 2021. https://www.zdnet.com/article/ibms-first-quantum-computer-outside-of-the-us-has-just-gone-live/ (Year: 2021).*

* cited by examiner

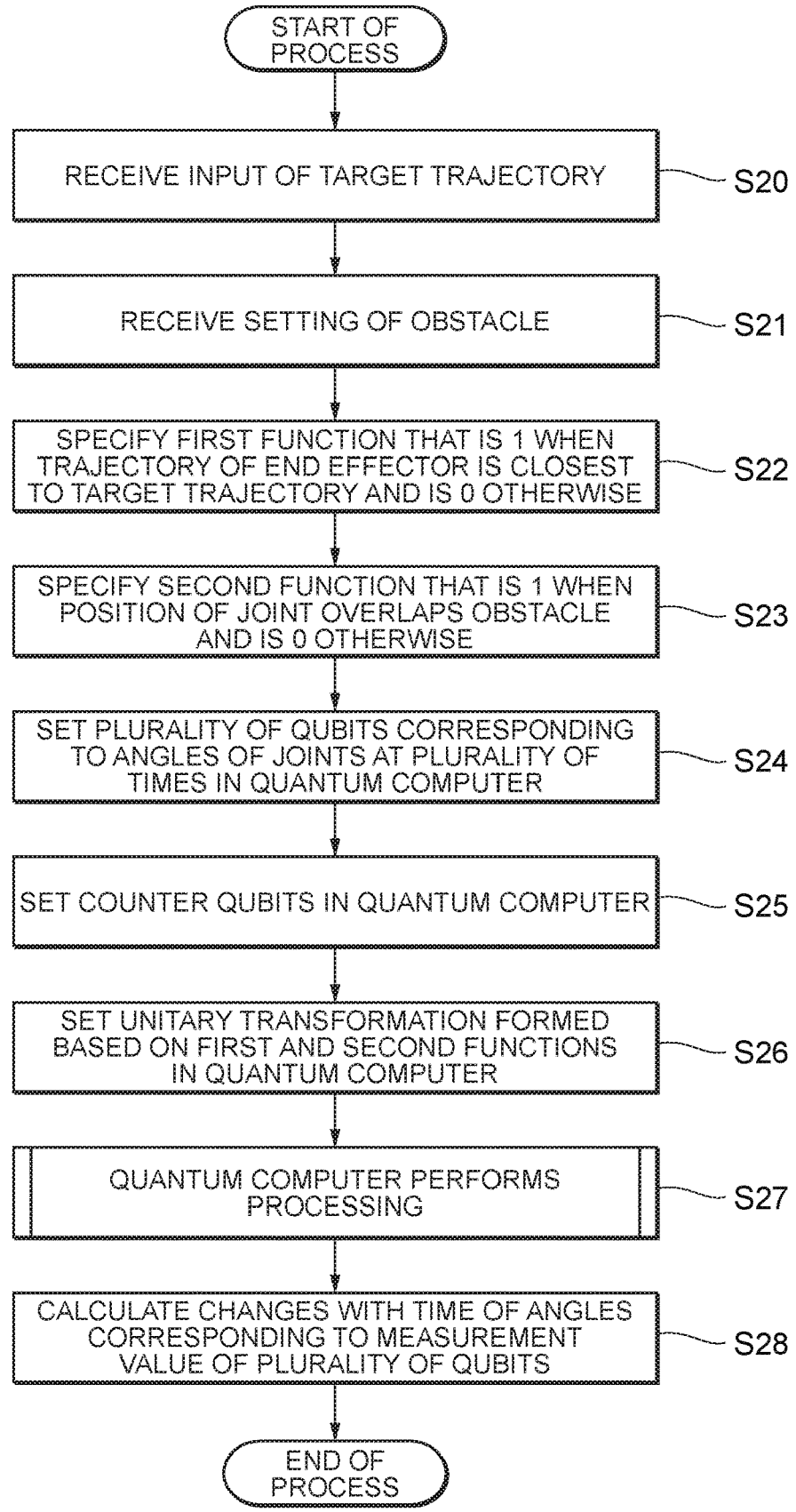

US 11,602,846 B2

SEARCH APPARATUS, SEARCH METHOD, AND SEARCH PROGRAM

BACKGROUND

Field

The present invention relates to a search device, a search method, and a search program.

Description of Related Art

In the related art, the angles of joints of a robot arm may be calculated from a target position of an end effector provided on the robot arm to control the end effector to be in a desired position.

For example, Patent Publication JP-A-H02-5129 describes a coordinate inverse transformation processor that performs a coordinate inverse transformation using a coordinate rotational digital computer (CORDIC) algorithm.

SUMMARY

In recent years, research on quantum computers that perform computation using quantum mechanical properties of matter has been underway. Quantum computers are probabilistic computers which can perform computations at higher speeds than classical computers by manipulating probability amplitudes to increase a legitimate output probability alone and can sometimes dramatically reduce the computation time for specific problems.

For example, using a quantum computer is expected to reduce the computation time even for a problem regarding control of the posture of a robot such as calculating the angles of joints of a robot arm from a target position of an end effector of the robot arm. However, when a quantum computer is used, the computation time is not always shorter than that of a classical computer and it is necessary to adopt an appropriate quantum algorithm depending on the problem.

Therefore, the present invention provides a search device, a search method, and a search program for causing a quantum computer to search for angles of joints of a robot such as a robot arm at which the posture of the robot satisfies a predetermined condition by using a quantum algorithm.

A search device according to an aspect of the present invention includes: a specifying unit configured to specify a function for identifying whether or not a posture of a robot satisfies a predetermined condition; a setting unit configured to apply a unitary transformation formed based on the function to a plurality of qubits corresponding to an angle of a joint of the robot a number of times according to the number of the plurality of qubits and to set a quantum computer to search for a state of the plurality of qubits corresponding to the angle satisfying the predetermined condition according to a quantum algorithm; and a calculation unit configured to calculate the angle corresponding to a measurement value of the plurality of qubits.

According to this aspect, the quantum computer can be caused to search for an angle of the joint at which the posture of the robot satisfies a predetermined condition, by using, for example, Grover's algorithm as a quantum algorithm and thus the angle can be searched for at a higher speed than when the same processing is executed by a classical computer.

According to the present invention, it is possible to provide a search device, a search method, and a search program for causing a quantum computer to search for angles of joints of a robot such as a robot arm at which the posture of the robot satisfies a predetermined condition by using a quantum algorithm.

BRIEF DESCRIPTION OF DRAWINGS

FIG. 7 is a flowchart of the search process performed by the search device according to the present embodiment.

DETAILED DESCRIPTION

Embodiments of the present invention will be described with reference to the accompanying drawings. In each figure, elements with the same reference signs have the same or similar structures.

Figure 1:
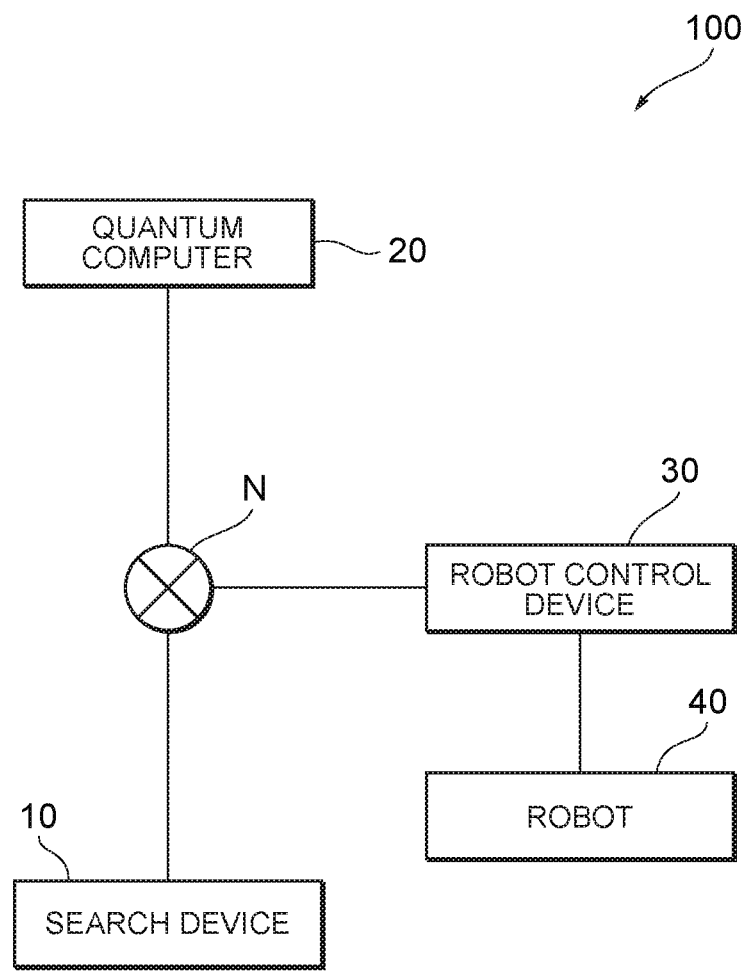
FIG. 1 is a diagram showing an overview of a search system including a search device according to an embodiment of the present invention.

FIG. 1 is a diagram showing an overview of a search system 100 including a search device 10 according to an embodiment of the present invention. The search system 100 includes a search device 10, a quantum computer 20, a robot control device 30, and a robot 40.

The search device 10 is a device that searches for angles of joints at which the posture of the robot 40 satisfies a predetermined condition. Here, an example of a robot arm will be described as an example of a robot. The search device 10 sets the quantum computer 20 to execute a quantum algorithm for searching for appropriate angles of joints. Hereinafter, an example in which Grover's algorithm is used as a quantum algorithm for searching for angles will be described.

The quantum computer 20 is a computer that performs computation using quantum mechanical properties of matter and may be of a gate type. The quantum computer 20 may be formed of any hardware. The quantum computer 20 receives qubits and a setting relating to a unitary transformation for manipulating the qubits from the search device 10 via a communication network N. The communication network N is a wired or wireless communication network and may be, for example, the Internet, a local area network (LAN), or the like.

The robot control device 30 receives information on angles of the robot arm from the search device 10 via the communication network N and controls the robot 40. The robot control device 30 may be formed of, for example, a programmable logic controller (PLC).

The robot 40 includes one or more robot arms and performs a predetermined operation through end effectors provided at the tips of the robot arms. Each robot arm may operate by one or more servo motors and angles of joints found by the search device 10 may represent angles of the servo motors. Joints refer to mechanisms (for example, C1 and C2 in FIG. 4) that rotate portions of a robot arm which are closer to the tip than the joints and include a mechanism at the base of the robot arm. Mechanisms for connecting joints or connecting a joint and an end effector in a robot arm are referred to as arms (which correspond to, for example, 41 and 42 in FIG. 4).

Figure 2:
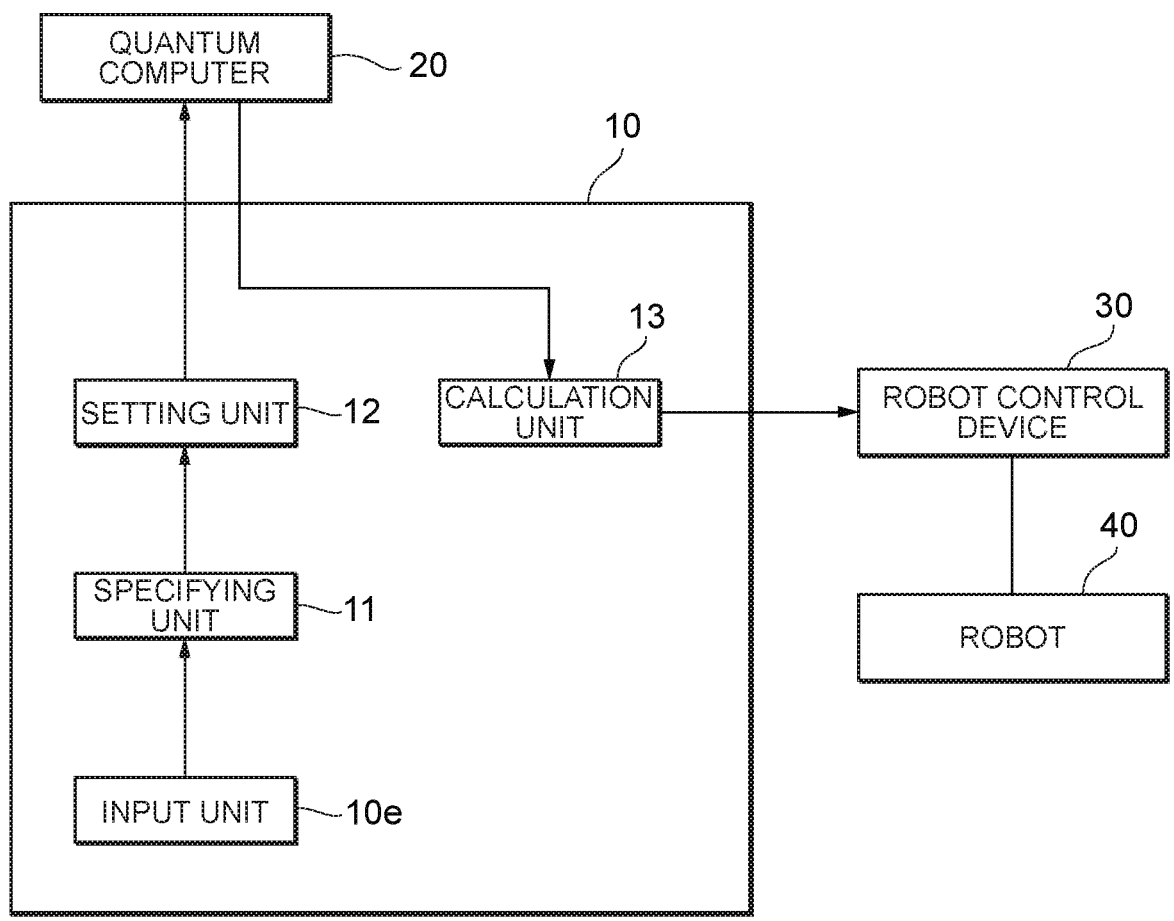
FIG. 2 is a diagram showing functional blocks of the search device according to the present embodiment.

FIG. 2 is a diagram showing functional blocks of the search device 10 according to the present embodiment. The search device 10 includes a specifying unit 11, a setting unit 12, and a calculation unit 13.

The specifying unit 11 specifies a function for identifying whether or not the posture of the robot 40 satisfies a predetermined condition. Here, the predetermined condition may include a condition indicating that the position of the end effector provided on the robot arm is closest to a target position. A specific form of the function will be described in detail later.

The setting unit 12 applies a unitary transformation formed based on the specified function to a plurality of qubits corresponding to the angles of joints of the robot 40 a number of times according to the number of the plurality of qubits and sets the quantum computer 20 to search for states of the qubits corresponding to the angles satisfying the predetermined condition according to Grover's algorithm.

An angle of a joint of the robot arm may be represented by a bit string according to the CORDIC algorithm. For example, if the robot arm has M joints and angles $\theta_1$, $\theta_2$, $\theta_M$ of the M joints are each represented by an a-bit string according to the CORDIC algorithm, the setting unit 12 may set n(=a×M) qubits in the quantum computer 20. Thus, the quantum states are $N(=2^{a \times M})$ dimensional. Use of the CORDIC algorithm allows for representation of the angles of the joints of the robot arm by a bit string, such that a plurality of qubits corresponding to the angles of the joints can be appropriately set.

Further, the setting unit 12 may set counter qubits, which correspond to whether or not the joints of the robot arm interfere with an obstacle, in the quantum computer 20. When the robot arm has M joints, the setting unit 12 may set counter qubits, the number of which is obtained by rounding up $\log_2$ M, in the quantum computer 20. The setting unit 12 may set counter qubits, the number of which is obtained by rounding up $\log_2$ (M−1), in the quantum computer 20 when the end effector is controlled to approach a target position and whether or not the end effector interferes with an obstacle is not taken into consideration. By setting the counter qubits, whether or not the joints of the robot arm interfere with an obstacle can be identified using the counter qubits, and angles of the joints at which that the joints do not interfere with the obstacle can be searched for at a high speed according to Grover's algorithm as will be described in detail later.

When the two states of each qubit are represented as |0> and |1>, the setting unit 12 may set an initial state |s> of N qubits and counter qubits, the number of which is obtained by rounding up $\log_2$ M, as a state represented by the following Expression (1).

$$|s\rangle = \frac{1}{\sqrt{N}} \sum_{x=0}^{N-1} |x\rangle \otimes |c_x\rangle \quad \text{[Math. 1]}$$

Here, |x> is a direct product state of n qubits. $|c_x\rangle$ is a direct product state of counter qubits, the number of which is obtained by rounding up $\log_2$ M, and may be initialized to a state of $|c_x\rangle$=|00 . . . 0>.

The unitary transformation set by the setting unit 12 includes a first unitary transformation for inverting the phase of the direct product state of a plurality of qubits and counter qubits when angles of the robot arm corresponding to the plurality of qubits satisfy a predetermined condition and the counter qubits correspond to the joints of the robot arm not interfering with an obstacle and leaving the phase of the direct product state of the plurality of qubits and the counter qubits unchanged when the angles of the robot arm corresponding to the plurality of qubits do not satisfy the predetermined condition or when the counter qubits correspond to the joints of the robot arm interfering with an obstacle. The unitary transformation further includes a second unitary transformation for inverting the direct product state of the plurality of qubits and the counter qubits with respect to a predetermined quantum state. Details of the first and second unitary transformations will be described with reference to FIG. 4.

The calculation unit 13 calculates angles of the joints of the robot 40 corresponding to a measurement value of the plurality of qubits. The quantum computer 20 performs quantum computation using Grover's algorithm with the qubits and the unitary transformation set by the setting unit 12 and transmits a value obtained by measuring the qubits to the search device 10. The calculation unit 13 calculates the angles of the joints of the robot 40 using the CORDIC algorithm on the basis of the received measurement value.

According to the search device 10 of the present embodiment, the quantum computer 20 can be caused to search for angles of joints at which the posture of the robot 40 satisfies a predetermined condition by using Grover's algorithm as a quantum algorithm as described above, and the angles can be searched for at a higher speed than when the same processing is executed by a classical computer.

Figure 3:
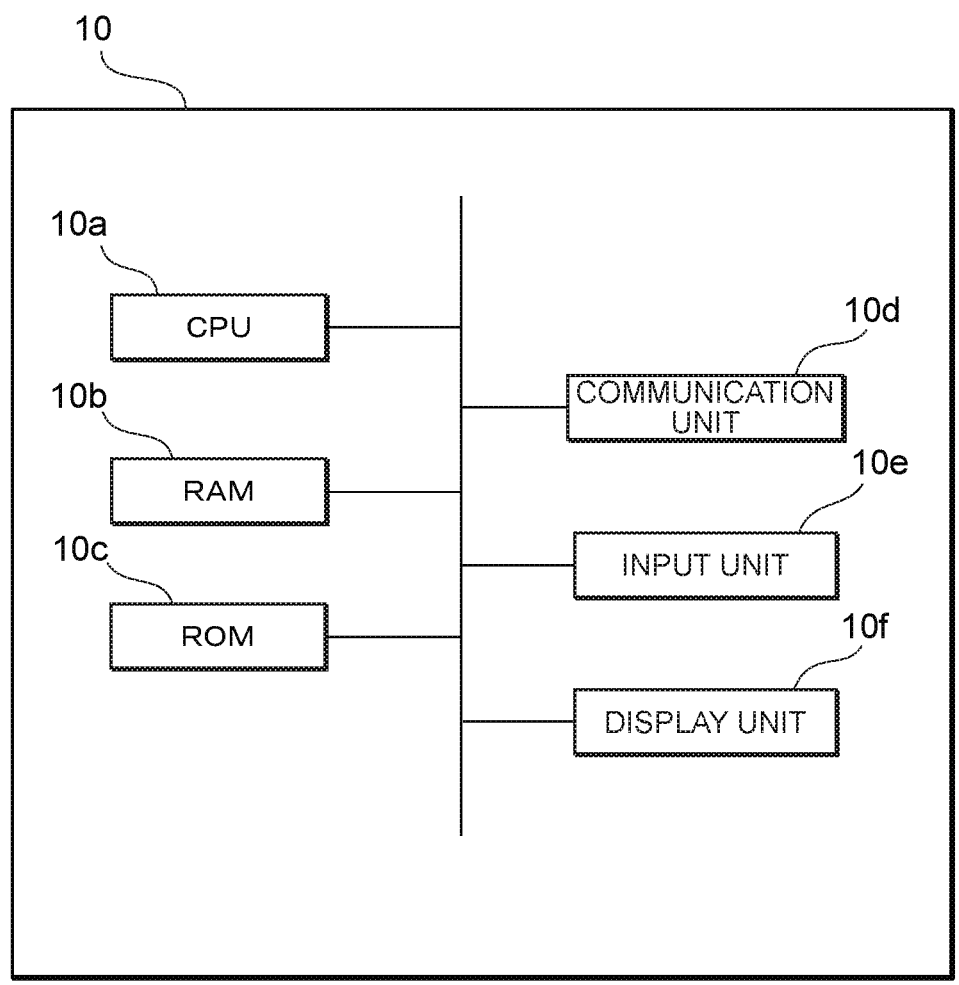
FIG. 3 is a diagram showing a physical structure of the search device according to the present embodiment.

FIG. 3 is a diagram showing a physical structure of the search device 10 according to the present embodiment. The search device 10 includes a central processing unit (CPU) 10a corresponding to a processor, a random access memory (RAM) 10b corresponding to a storage unit, a read only memory (ROM) 10c corresponding to a storage unit, a communication unit 10d, an input unit 10e, and a display unit 10f. These components are connected to each other via a bus such that data can be transmitted and received therebetween. Although the search device 10 are described as being constituted by one classical computer in this example, the search device 10 may be implemented by combining a plurality of classical computers. The components shown in FIG. 3 are examples, and the search device 10 may include components other than those shown and may not include some of those shown.

The CPU 10a is a processor that performs control relating to execution of programs stored in the RAM 10b or the ROM 10c and calculates and processes data. The CPU 10a executes a program (search program) that causes the quantum computer to search for angles of the joints of the robot 40 at which the posture of the robot 40 satisfies a predetermined condition. The CPU 10a receives various data from the input unit 10e or the communication unit 10d and displays calculation results of the data on the display unit 10f or stores the same in the RAM 10b or the ROM 10c. The CPU 10a may be a classical processor that does not actively use the quantum mechanical properties of matter.

The RAM 10b is a storage unit to which data can be rewritten and may be formed of, for example, semiconductor storage elements. The RAM 10b may store the search program to be executed by the CPU 10a, the target position, and the like. These are examples, and the RAM 10b may store other data and may not store some of the data described here.

The ROM 10c is a storage unit from which data can be read and may be formed of, for example, semiconductor storage elements. The ROM 10c may store, for example, the search program and data that is not to be rewritten.

The communication unit 10d is an interface that connects the search device 10 to other devices. The communication unit 10d may be connected to the communication network N such as the Internet.

The input unit 10e receives a data input from the user and may include, for example, a keyboard and a touch panel.

The display unit 10f visually displays calculation results of the CPU 10a and may be formed of, for example, a liquid crystal display (LCD). The display unit 10f may display search results of angles of joints.

The search program may be provided by being stored in a computer-readable storage medium such as the RAM 10b or the ROM 10c or may be provided via the communication network connected through the communication unit 10d. In the search device 10, the various operations described with reference to FIG. 2 are realized by the CPU 10a executing the search program. The physical components are examples and may not necessarily be separate components. For example, the search device 10 may include a large-scale integration (LSI) into which the CPU 10a, the RAM 10b, and the ROM 10c are integrated.

Figure 4:
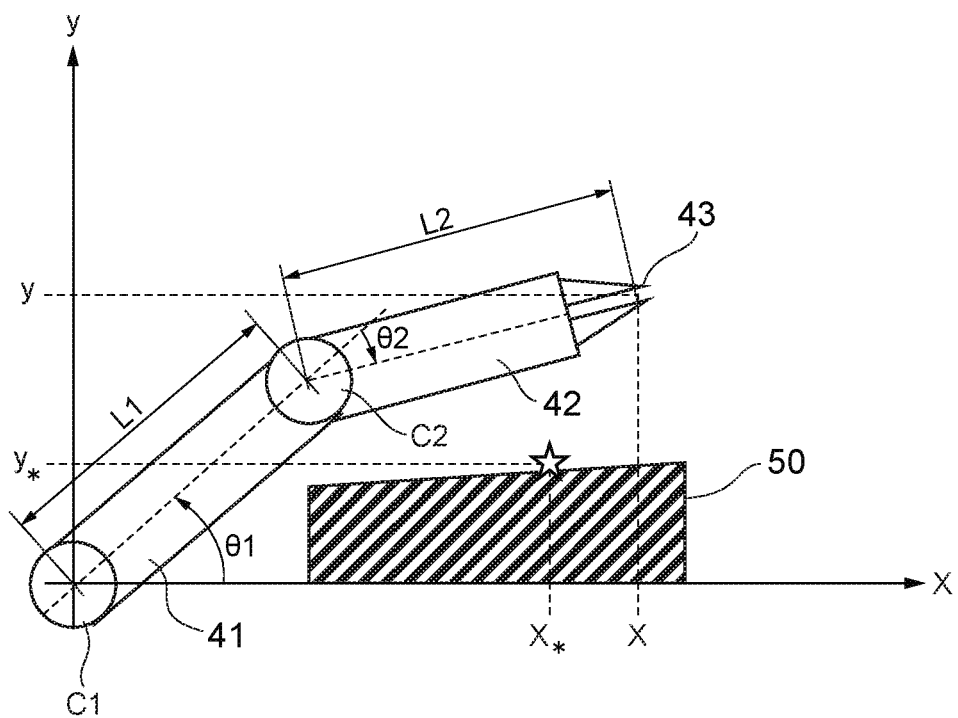
FIG. 4 is a diagram showing an outline of angles of a robot arm that are to be searched for by the search device according to the present embodiment.

FIG. 4 is a diagram showing an outline of angles of the robot arm that are to be searched for by the search device 10 according to the present embodiment. FIG. 4 shows an example in which a robot arm including a first arm 41, a second arm 42, and an end effector 43 operates in an x-y plane.

The first arm 41 has a length L1 and the angle thereof measured counterclockwise from the x-axis is θ1. The second arm 42 has a length L2 and the angle thereof measured clockwise from the extending direction of the first arm 41 is θ2. The angle of the second arm 42 shown in this example has a negative value if measured counterclockwise from the extending direction of the first arm 41. The end effector 43 is provided at the tip of the second arm 42 and the position thereof in the x-y plane is (x, y). In FIG. 4, the target position of the end effector 43 is represented by (x*, y*).

A first function f(θ1, θ2) for identifying whether or not a condition indicating that the position (x, y) of the end effector 43 is closest to the target position (x*, y*) is satisfied may be represented by the following Expression (2).

$$f(\theta_1, \theta_2) = \begin{cases} 1 & (\text{if } (x - x_*)^2 + (y - y_*)^2 \leq \epsilon) \\ 0 & (\text{otherwise}) \end{cases} \qquad [\text{Math. 2}]$$

Here, (x, y) is expressed as a function of (θ1, θ2) as in the following Expression (3).

$$\begin{cases} x = L_1\cos(\theta_1) + L_2\cos(\theta_1 + \theta_2) \\ y = L_1\sin(\theta_1) + L_2\sin(\theta_1 + \theta_2) \end{cases} \qquad [\text{Math. 3}]$$

ε in Expression (2) is a minute amount defined based on an error of the CORDIC algorithm and is substantially 0. That is, the first function f(θ1, θ2) is a function that is 1 when the position of the end effector 43 matches the target position and is 0 when the position thereof does not match the target position.

An obstacle 50 is shown in FIG. 4. An outer shape of the obstacle 50 in this example is given by a function y=g(x). In this case, a second function h1 (θ1) for identifying whether or not a condition indicating that a joint connecting the first arm 41 and the second arm 42 does not interfere with the obstacle 50 is satisfied may be represented by the following Expression (4).

$$h_1(\theta_1) = \begin{cases} 1 & (\text{if } L_1\sin\theta_1 < g(L_1\cos\theta_1)) \\ 0 & (\text{otherwise}) \end{cases} \qquad [\text{Math. 4}]$$

A second function h2(θ1, θ2) for identifying whether or not a condition indicating that the tip of the second arm 42 (the end effector 43) does not interfere with the obstacle 50 is satisfied may be represented by the following Expression (5).

$$h_2(\theta_1, \theta_2) = \begin{cases} 1 & (\text{if } L_1\sin\theta_1 + L_2\sin(\theta_1 + \theta_2) < \\ & g(L_1\cos\theta_1 + L_2\cos(\theta_1 + \theta_2))) \\ 0 & (\text{otherwise}) \end{cases} \qquad [\text{Math. 5}]$$

The quantum computer 20 increments the counter qubits for a state x where at least either one of the first function and second function has a value of 1. Thus, the value of the counter qubits becomes 1 or more if any joint interferes with the obstacle 50. In contrast, the value of the counter qubits is 0 if no joint interferes with the obstacle 50.

The setting unit 12 may set a first unitary transformation $U_1$ represented by the following Expression (6) in the quantum computer 20. Here, x is an amount of (θ1, θ2) represented by a bit string according to the CORDIC algorithm.

$$U_1(|x\rangle \otimes |c_x\rangle) = \begin{cases} -|x\rangle \otimes |c_x\rangle & (\text{if } f(x) = 1 \text{ and } c_x = 0) \\ |x\rangle \otimes |c_x\rangle & (\text{otherwise}) \end{cases} \qquad [\text{Math. 6}]$$

The setting unit 12 may set a second unitary transformation $U_2$ represented by the following Expression (7) in the quantum computer 20. Here, a state |s⟩ is represented by Expression (1).

$$U_2 = 2|s\rangle\langle s| \qquad [\text{Math. 7}]$$

The setting unit 12 sets an initial state |s⟩ in the quantum computer 20 and causes the first unitary transformation and the second unitary transformation $U_2U_1$ to be applied a number of times according to the number of the plurality of qubits. Specifically, $U_2U_1$ may be caused to be applied the same number of times as that obtained by rounding up or down π/4√N. Thus, by applying the unitary transformation to the direct product state of the plurality of qubits and the counter qubits to amplify the amplitude of a quantum state satisfying a predetermined condition, the probability that the quantum state representing angles of the joints at which the posture of the robot 40 satisfies the predetermined condition is measured can be increased.

In addition, by forming the first unitary transformation with the second function expressing a condition indicating that the joints do not interfere with the obstacle, angles of the joints at which the robot 40 does not interfere with the obstacle can be searched for at a high speed.

Figure 5:
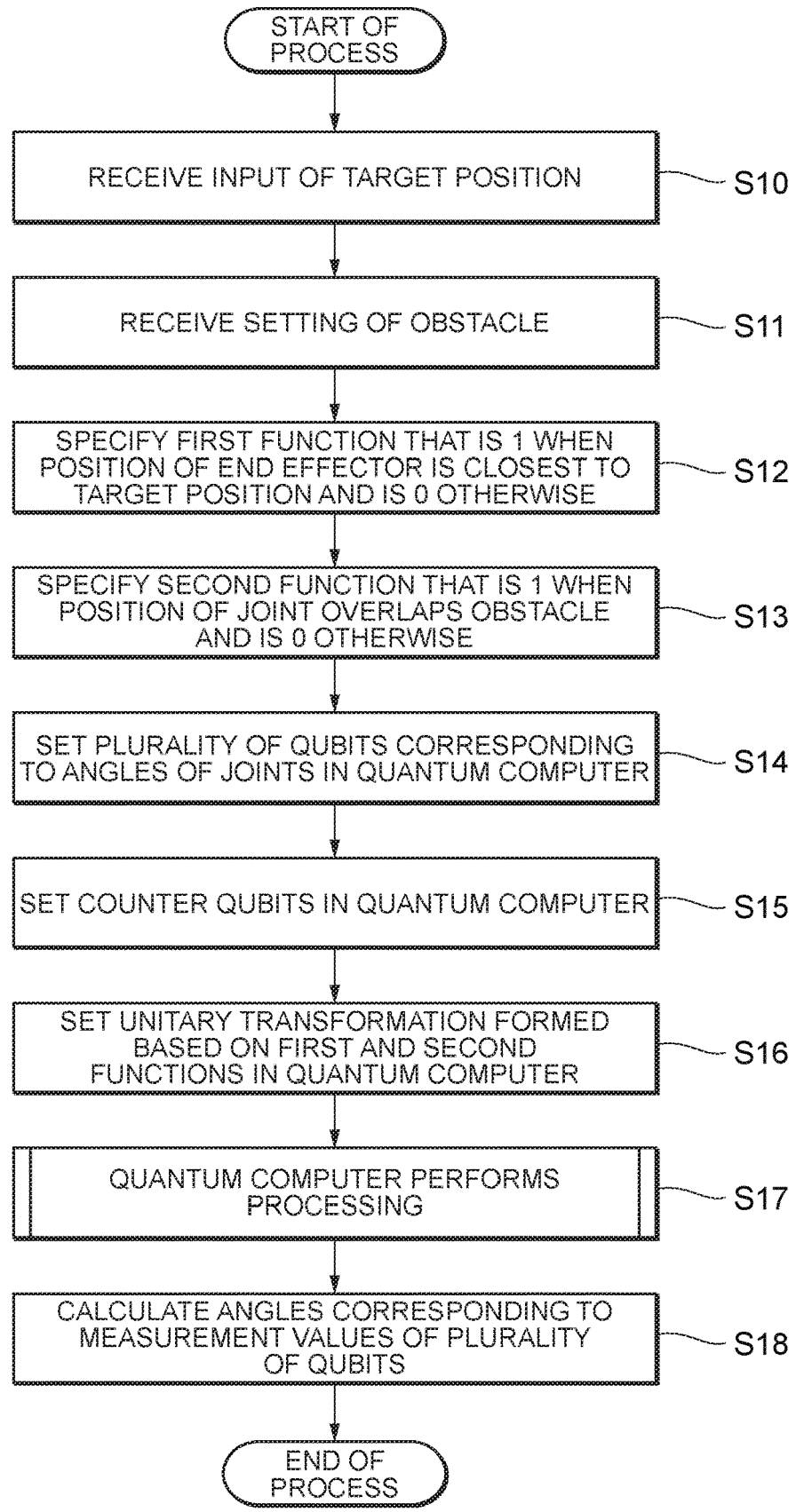
FIG. 5 is a flowchart of a search process performed by the search device according to the present embodiment.

FIG. 5 is a flowchart of a search process performed by the search device 10 according to the present embodiment. The search device 10 first receives an input of a target position of the end effector (S10). In addition, the search device 10 receives a setting of an obstacle (S11).

Thereafter, the search device 10 specifies a first function that is 1 when the position of the end effector is closest to the target position and is 0 otherwise (S12). In addition, the search device 10 specifies a second function that is 1 when the position of the joint overlaps an obstacle and is 0 otherwise (S13).

The search device 10 sets a plurality of qubits corresponding to the angles of joints in the quantum computer 20 (S14). In addition, the search device 10 sets counter qubits in the quantum computer 20 (S15). Further, the search device 10 sets a unitary transformation formed based on the first and second functions in the quantum computer 20 (S16).

Thereafter, the quantum computer 20 performs processing (S17). The processing performed by the quantum computer 20 will be described in detail with reference to the next figure.

Finally, the search device 10 calculates angles corresponding to a measurement value of the plurality of qubits (S18). Thereafter, the search device 10 may transmit the calculated angles to the robot control device 30. Then, the search process ends.

Figure 6:
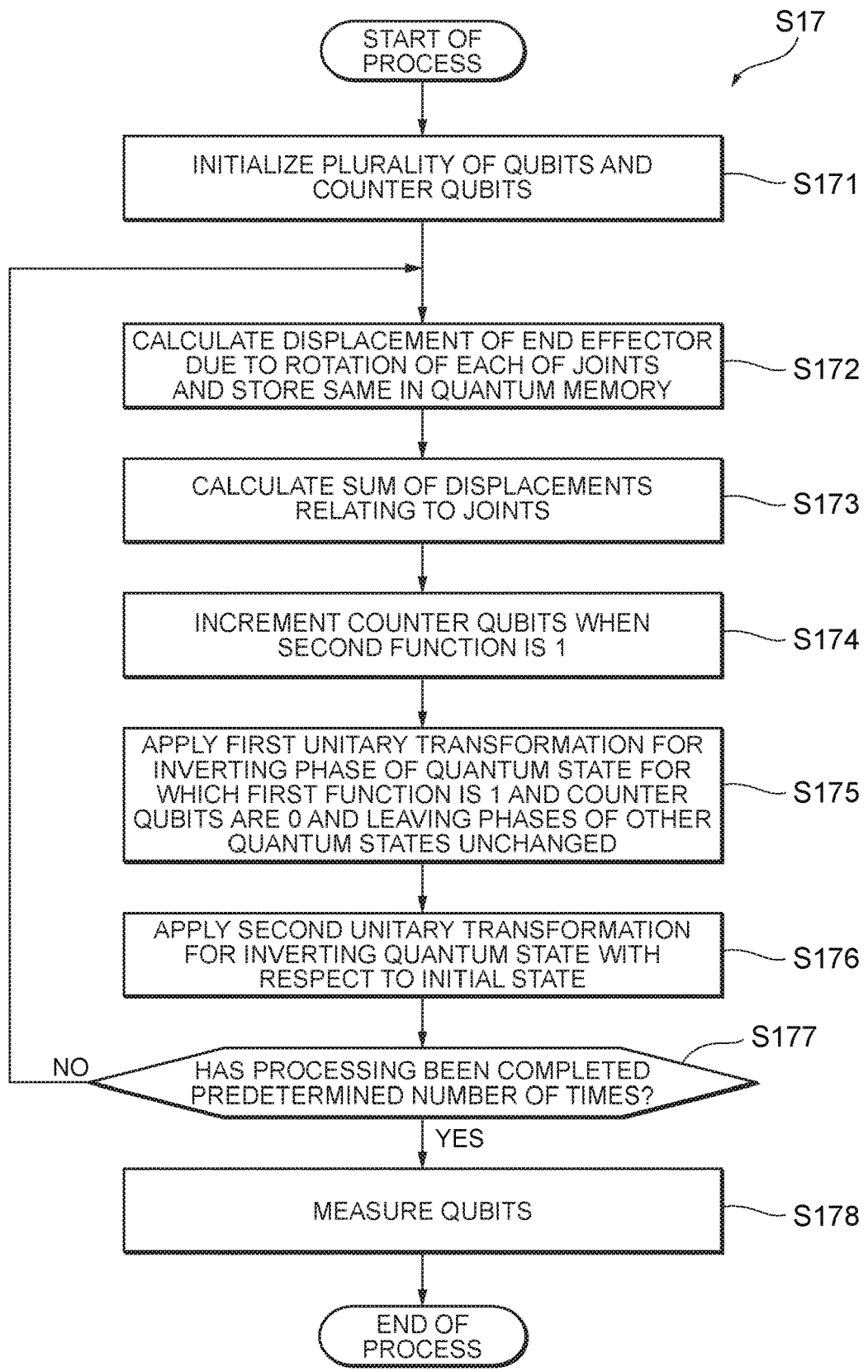
FIG. 6 is a flowchart of Grover's algorithm that a quantum computer is set to execute by the search device according to the present embodiment.

FIG. 6 is a flowchart of Grover's algorithm that the quantum computer 20 is set to execute by the search device 10 according to the present embodiment. FIG. 6 shows details of the processing performed by the quantum computer 20 (S17) shown in FIG. 5. First, the quantum computer 20 initializes a plurality of qubits and counter qubits (S171).

Thereafter, the quantum computer 20 calculates a displacement of the end effector due to rotation of each of the plurality of joints and stores the calculated displacement in the quantum memory (S172). For example, in the example shown in FIG. 4, the quantum computer 20 may calculate displacements of the end effector 43 when the angle θ1 of the first arm 41 is changed over all possible values and calculate displacements of the end effector 43 when the angle θ2 of the second arm 42 is changed over all possible values.

The quantum computer 20 calculates the sum of displacements of the end effector relating to the plurality of joints (S173). Then, the quantum computer 20 calculates the value of the second function for each of the cases where the angles of the plurality of joints are changed to all possible values and increments the counter qubits when the second function is 1 (S174). Thus, the value of the counter qubits becomes 1 or more for a quantum state representing angles of joints at which any joint interferes with the obstacle.

The quantum computer 20 causes the first unitary transformation for inverting the phase of a quantum state for which the first function is 1 and the counter qubits are 0 and leaving the phases of other quantum states unchanged to be applied to the direct product state of the plurality of qubits and the counter qubits (S175). Further, the quantum computer 20 causes the second unitary transformation for inverting a quantum state with respect to the initial state to be applied to the direct product state of the plurality of qubits and the counter qubits (S176).

Thereafter, the quantum computer 20 determines whether or not the first and second unitary transformations have been applied a predetermined number of times (S177). Here, the predetermined number of times is approximately √N. When the processing has not been completed the predetermined number of times (S177: NO), the quantum computer 20 performs the processes of S172 to S176 again. In contrast, when the processing has been completed the predetermined number of times (S177: YES), the quantum computer 20 measures the plurality of qubits (S178) and transmits the measured value to the search device 10. Then, the processing of the quantum computer 20 ends.

FIG. 7 is a flowchart of the search process performed by the search device 10 according to the present embodiment. FIG. 7 shows a process for searching for a change with time of the posture of the robot arm which satisfies a condition indicating that the trajectory of the end effector provided on the robot arm is closest to a target trajectory.

The search device 10 first receives an input of a target trajectory of the end effector (S20). In addition, the search device 10 receives a setting of an obstacle (S21).

Thereafter, the search device 10 specifies a first function that is 1 when the trajectory of the end effector is closest to the target trajectory and is 0 otherwise (S22). For example, the search device 10 may specify a first function f such that $f = \Pi_{t=1}^{T} f_t$ by dividing the time over which the end effector moves into sections from t=1 to T, determining a target position $(x^*_t, y^*_t)$ of the end effector for each section, and defining $f_t$ according to Expression (2) for each section.

Further, the search device 10 specifies a second function that is 1 when the positions of the joints overlap the obstacle and is 0 otherwise (S23). Also, for the second functions h1 and h2, the search device 10 may specify, for example, $h1_t$ and $h2_t$ according to Expressions (4) and (5) for each section from t=1 to T.

The search device 10 sets a plurality of qubits corresponding to the angles of the joints at a plurality of times in the quantum computer (S24). Specifically, the search device 10 may set $|x_t\rangle$ which is a direct product state of n qubits for each section from t=1 to T and set $|x\rangle = \Pi_{t=1}^{T} |x_t\rangle$ which is a direct product of $|x_t\rangle$ over all sections in the quantum computer 20. Further, the search device 10 sets counter qubits in the quantum computer 20 (S25). Here, the number of counter qubits may be a number obtained by rounding up $\log_2(M \times T)$.

Further, the search device 10 sets a unitary transformation formed based on the first and second functions in the quantum computer 20 (S26). Here, a first unitary transformation may be represented by Expression (6) and a second unitary transformation may be represented by Expression (7).

Thereafter, the quantum computer 20 performs processing (S27). The processing performed by the quantum computer 20 is similar to that shown in FIG. 6.

Finally, the search device 10 calculates changes with time of angles corresponding to a measurement value of the plurality of qubits (S28). Thereafter, the search device 10 may transmit the calculated changes with time of the angles to the robot control device 30. Thus, a time series of the angles of the joints in which the trajectory of the end effector becomes the target trajectory can be searched for at a high speed. Then, the search process ends.

Other Embodiments

In the embodiment described above, the setting unit 12 determines whether to invert the phase of the direct product state of a plurality of qubits and counter qubits on the basis of whether or not the joints of the robot arm interfere with an obstacle. However, the present invention is not limited to this. The unitary transformation set by the setting unit 12 may include a first unitary transformation for inverting the phase of the direct product state of a plurality of qubits and counter qubits when angles of the robot arm corresponding to the plurality of qubits satisfy a predetermined condition and the counter qubits correspond to the joints and arms of the robot arm not interfering with an obstacle and leaving the phase of the direct product state of the plurality of qubits and the counter qubits unchanged when the angles of the robot arm corresponding to the plurality of qubits do not satisfy the predetermined condition or when the counter qubits correspond to the joints and arms of the robot arm interfering with an obstacle.

In this case, a second function may identify, for example, whether or not a condition indicating that an arbitrary point on the robot arm does not interfere with the obstacle 50 is satisfied. For example, a second function in this case taking the arm 42 as an example is represented by Expression (8) if an arbitrary point is located on the arm 42 at a distance Lx from the joint C2.

$$h_2(\theta_1, \theta_2) = \begin{cases} 1 & \text{(if } L_1\sin\theta_1 + L_x\sin(\theta_1 + \theta_2) < \\ & g(L_1\cos\theta_1 + L_x\cos(\theta_1 + \theta_2))) \\ 0 & \text{(otherwise)} \end{cases} \quad \text{[Math. 8]}$$

The quantum computer 20 increments the counter qubits when there is a point on the arm 42 where the value of the second function is 1. Thus, the value of the counter qubits becomes 1 or more if the arm 42 interferes with the obstacle 50. In contrast, the value of the counter qubits is 0 if there is no point on the arm 42 where the value of the second function is 1.

The embodiments described above are provided only for better understanding of the present invention and are not intended to be construed as limiting the present invention. Each element included in the embodiments and the arrangement, material, condition, shape, size, and the like thereof are not limited to those illustrated and can be changed as appropriate. The configurations shown in different embodiments can also be partially replaced or combined.

What is claimed is:

1. A search device comprising a processor configured to perform the steps of:
   specifying a function for identifying whether or not a posture of a robot comprising a robot arm satisfies a predetermined condition, wherein the robot arm includes a joint which rotates a portion of the robot arm closer to a tip of the robot;
   setting a quantum computer so as to search for a state of a plurality of qubits corresponding to an angle of the joint of the robot arm satisfying the predetermined condition, by setting the plurality of qubits to an initial state in which all possible quantum states for the plurality of the qubits are superposed, and by applying unitary transformations formed based on the function to the plurality of qubits in the initial state a number of times according to the number of the plurality of qubits; and
   calculating the angle corresponding to a measurement value of the plurality of qubits,
   wherein the unitary transformations include a first unitary transformation for inverting a phase of a quantum state corresponding to the angle of the joint of the robot arm satisfying the predetermined condition, and a second unitary transformation for inverting a quantum state with respect to a predetermined quantum state, and
   wherein the calculated angle is transmitted to a robot control device to control the robot.

2. The search device according to claim 1, wherein the predetermined condition includes a condition indicating that a position of an end effector provided on the robot is closest to a target position.

3. The search device according to claim 1, wherein the predetermined condition includes a condition indicating that a trajectory of an end effector provided on the robot is closest to a target trajectory.

4. The search device according to claim 1, wherein the predetermined condition includes a condition indicating that the joint does not interfere with an obstacle.

5. The search device according to claim 4, wherein the processor is further configured to perform the step of
   setting, in the quantum computer, a counter qubit that corresponds to whether or not the joint interferes with the obstacle.

6. The search device according to claim 5, wherein
   the first unitary transformation is for
   inverting a phase of a direct product state of the plurality of qubits and the counter qubit when the angle corresponding to the plurality of qubits satisfies the predetermined condition and the counter qubit corresponds to the joint not interfering with the obstacle; and
   leaving the phase of the direct product state of the plurality of qubits and the counter qubit unchanged when the angle corresponding to the plurality of qubits does not satisfy the predetermined condition or when the counter qubit corresponds to the joint interfering with the obstacle; and
   the second unitary transformation is for inverting the direct product state of the plurality of qubits and the counter qubit with respect to a predetermined quantum state.

7. The search device according to claim 1, wherein
   the angle is represented by a bit string according to a CORDIC algorithm.

8. A computer-implemented search method comprising:
   specifying a function for identifying whether or not a posture of a robot comprising a robot arm satisfies a predetermined condition, wherein the robot arm includes a joint which rotates a portion of the robot arm closer to a tip of the robot;
   setting a quantum computer so as to search for a state of a plurality of qubits corresponding to an angle of the joint of the robot arm satisfying the predetermined condition, by setting the plurality of qubits to an initial state in which all possible quantum states for the plurality of the qubits are superposed, and by applying unitary transformations formed based on the function to the plurality of qubits in the initial state a number of times according to the number of the plurality of qubits; and
   calculating the angle corresponding to a measurement value of the plurality of qubits,
   wherein the unitary transformations include a first unitary transformation for inverting a phase of a quantum state corresponding to the angle of the joint of the robot arm satisfying the predetermined condition, and a second unitary transformation for inverting a quantum state with respect to a predetermined quantum state, and
   wherein the calculated angle is transmitted to a robot control device to control the robot.

9. A non-transitory computer-readable storage medium storing a program which, when executed by a processor provided in a search device, performs:
   specifying a function for identifying whether or not a posture of a robot comprising a robot arm satisfies a predetermined condition, wherein the robot arm includes a joint which rotates a portion of the robot arm closer to a tip of the robot;

setting a quantum computer so as to search for a state of a plurality of qubits corresponding to an angle of the joint of the robot arm satisfying the predetermined condition, by setting the plurality of qubits to an initial state in which all possible quantum states for the plurality of the qubits are superposed, and by applying unitary transformations formed based on the function to the plurality of qubits in the initial state a number of times according to the number of the plurality of qubits; and calculating the angle corresponding to a measurement value of the plurality of qubits, wherein the unitary transformations include a first unitary transformation for inverting a phase of a quantum state corresponding to the angle of the joint of the robot arm satisfying the predetermined condition, and a second unitary transformation for inverting a quantum state with respect to a predetermined quantum state, and wherein the calculated angle is transmitted to a robot control device to control the robot.

\* \* \* \* \*